US007208923B2

(12) United States Patent
Horimoto

(10) Patent No.: US 7,208,923 B2
(45) Date of Patent: Apr. 24, 2007

(54) MULTIPLE-OUTPUT POWER DEVICE, AND MOBILE DEVICE USING THE SAME

(75) Inventor: Masashi Horimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 262 days.

(21) Appl. No.: 10/929,545

(22) Filed: Aug. 31, 2004

(65) Prior Publication Data

US 2005/0052171 A1 Mar. 10, 2005

(30) Foreign Application Priority Data

Sep. 8, 2003 (JP) .......................... P2003-314985

(51) Int. Cl.
*G05F 1/40* (2006.01)
*H02M 7/00* (2006.01)

(52) U.S. Cl. ...................................................... 323/269

(58) Field of Classification Search ................ 323/268, 323/269, 271, 272, 282, 285; 363/65, 71; 307/28, 29, 82, 84
See application file for complete search history.

(56) References Cited

U.S. PATENT DOCUMENTS 4,194,147 A * 3/1980 Payne et al. ................ 323/284
5,357,417 A * 10/1994 Desvaux ...................... 363/71
5,377,090 A * 12/1994 Steigerwald ................. 363/20
6,191,499 B1 * 2/2001 Severson et al. ............. 307/31
6,281,666 B1 * 8/2001 Tressler et al. ............. 323/272
6,792,553 B2 * 9/2004 Mar et al. ................... 713/330

FOREIGN PATENT DOCUMENTS

| | | |
|---|---|---|
| JP | 57-138170 | 8/1982 |
| JP | 61-77639 | 5/1986 |
| JP | 3-93261 | 4/1991 |
| JP | 5-17713 | 5/1993 |
| JP | A-8-234851 | 9/1996 |
| JP | 10-078826 | 3/1998 |

* cited by examiner

*Primary Examiner*—Matthew V. Nguyen
(74) *Attorney, Agent, or Firm*—Morgan, Lewis & Bockius LLP

(57) ABSTRACT

A multiple-output power device has a plurality of regulators for outputting regulated voltages; a plurality of power terminals for supplying an input voltage to the respective regulators; and a plurality of output terminals for outputting regulated output voltages from the plurality of regulators to the outside.

5 Claims, 4 Drawing Sheets

MULTIPLE-OUTPUT POWER DEVICE, AND MOBILE DEVICE USING THE SAME

BACKGROUND OF THE INVENTION

1. Field of the Invention

The present invention relates to a multiple-output power device which outputs a plurality of regulated voltages, and also relates to a mobile device using the power device thereof.

2. Description of the Related Art

In the technical field of the mobile devices, supplying voltages to a plurality of functional circuit elements has been individually performed by controlling their respective voltages. In such a related art, a plurality of regulators for outputting the plurality of voltages are embedded in a semiconductor integrated circuit body (hereinafter called an IC chip body), whereby the IC chip body is packaged as a semiconductor device which is used for a multiple-output power device.

FIG. 4 is a view showing the configuration of a multiple-output power device 400 as a related art. In FIG. 4, an IC chip body 300 is provided with a first regulator 301 for outputting a first output voltage Vo1; a second regulator 302 for outputting a second output voltage Vo2; and an $n^{th}$ regulator 30*n* for outputting an $n^{th}$ output voltage Von.

A source voltage Vcc supplied to a power supply pin 312 is input to these regulators 301 to 30*n*. At this time, the source voltage Vcc is supplied commonly to the regulators by way of a bonding wire 313, a power source pad 314, and internal wiring 311. In other words, input sides of the regulators 301 to 30*n* are connected commonly to the bonding wire 313 and the internal wiring 311.

The regulators 301 to 30*n*, being constituted by series regulators, for instance, are controlled so as to generate predetermined output voltages Vo1 to Von on the basis of a reference voltage. The output voltages Vo1 to Von are supplied to respective load devices by way of corresponding output pads 321 to 32*n*, bonding wires 331 to 33*n*, and output pins 341 to 34*n.*

In FIG. 4, the source voltage Vcc is taken as a voltage to be input to the regulators 301 to 30*n* However, there is a case where the source voltage Vcc is boosted by a booster circuit and the thus-boosted voltage is supplied as an input voltage to the regulators 301 to 30*n* as disclosed in JP-A-8-234851.

As mentioned previously, as to the multiple-output power device 400 in the related art, the power supply pin 312, the bonding wire 313, the power supply pad 314, and the internal wiring 311 are shared among the plurality of regulators 301 to 30*n*. Accordingly, when one of the regulators 301 to 30*n* has become activated/deactivated, or when the state of the load device that is connected to that regulator has changed, said situations might cause a voltage drop by the resistance of the bonding wire 313 or the resistance of the internal wiring 311, those provided in a stage preceding the regulator. The influence of the voltage drop also changes the input voltages of the other regulators. Particularly, in the mobile device which operates on battery power, the respective regulators 301 to 30*n* are activated/deactivated very frequently from a necessity of saving power consumption. Consequently, activation/deactivation by some of the regulators 301 to 30*n* often affects another regulators, which ends up deteriorating the voltage control properties of the entire multiple-output power device.

Although it depends on a regulator, there is another problem such that the length of the power supply line within the IC chip body 300 becomes excessively long because of restrictions placed on the internal wiring 311 being used as a common connection, which increases resistance of the wiring so as to deteriorate properties of the regulator, such as deviations in an input/output voltage difference or the like.

More specifically, for instance, the voltages Vo1 to Von output from the respective regulators 301 to 30*n* are controlled to predetermined voltages in accordance with specifications of the respective load devices. As mentioned previously, the voltage input to the respective regulators is the common source voltage Vcc. Therefore, in such a circuit configuration, the voltage differences between the common input source voltage Vcc and the respective output voltages Vo1 to Von are likely to cause internal loss energies in the respective regulators 301 to 30*n*. Especially, there has been pointed out a problem of the internal energy loss becoming relatively large one in a low voltage output regulator.

SUMMARY OF THE INVENTION

Accordingly, it is one of the objects of the present invention to prevent deterioration of voltage control properties of a multiple-output power device where a plurality of regulators are integrated into a single semiconductor integrated circuit so as to output a plurality of controlled voltages respectively, where said deterioration of voltage control properties is mainly caused by the operation of at least one regulator among said plurality of regulators.

It is further object of this invention to avoid deterioration of input/output voltage difference properties of the multiple-output power device, which would be caused by an increased resistance of the wiring used for the regulators. Moreover, the present invention is provided for enabling supply of input voltages in accordance with the output voltages of respective regulators and, thereby, reducing energy loss in the regulators.

It is still further object of this invention to provide longer an operable time of a mobile device using the multiple-output power device.

A multiple-output power device as the first aspect in this invention is to provide a multiple-output device with a plurality of regulators integrated into a single semiconductor integrated circuit from which a plurality of controlled voltages are output, said multiple-output power device comprising:

a plurality of power terminals, being provided in correspondence to said plurality of regulators, at which input voltages to said respective regulators are supplied; and a plurality of output terminals for outputting regulated output voltages from said plurality of regulators to the outside, wherein each of said plurality of regulators regulates a voltage input from respective one of said plurality of power terminals by comparing a detection voltage corresponding to an output voltage thereof with a reference voltage so as to output an output voltage.

A multiple-output power device as the second aspect in this invention is to provide a multiple-output power device with a plurality of regulators integrated into a single semiconductor integrated circuit from which a plurality of controlled voltages are output, said multiple-output power device comprising: a plurality of power terminals, being provided for regulator groups, where each of a plurality of power terminals supplies a common input voltage to respective one of said regulator groups, each group of said regulator groups including one or more regulators; and a plurality of output terminals for outputting regulated output voltages from said plurality of regulators to the outside, wherein each of said plurality of regulators regulates a voltage input from respective one of said plurality of power terminals by comparing a detection voltage corresponding to an output voltage thereof with a reference voltage so as to output an output voltage.

A multiple-output power device as the third aspect in this invention based on the multiple-output power device defined in the second aspect, it is characterized in that at least one of the regulator groups includes two or more regulators which are not simultaneously controlled to an operating state.

A multiple-output power device as the fourth aspect in this invention based on the multiple-output power device defined in the second aspects, it is characterized in that at least one of the regulator groups includes only one regulator, and at least one of the remaining regulator groups includes two or more regulators.

A multiple-output power device as the fifth aspect in this invention based on the multiple-output power device defined in any one of the first through the fourth aspects, it is characterized by further comprising a controller for individually controlling the plurality of regulators into an operating or suspended state.

A multiple-output power device as the sixth aspect in this invention based on the multiple-output power device defined in any one of the first through the fifth aspects, it is characterized by further comprising a reference voltage generation circuit for supplying the reference voltage to the plurality of regulators.

A multiple-output power device as the seventh aspect in this invention based on the multiple-output power device defined in any one of the first through the sixth aspects, it is characterized in that different input voltages are supplied to the plurality of regulators according to the nature of the regulators.

A mobile device as the eighth aspect in this invention is characterized by comprising the multiple-output power device defined in any one of the first through the seventh aspects.

According to the present invention, since the power terminals are provided in correspondence to the regulators or the regulator groups, it is possible to suppress the influence by the operating or suspended state of another regulator, or those made by another regulator group. It is also possible to suppress the influence by the state of a load device used therefor. Consequently, deterioration of the voltage control properties in each regulator can be suppressed.

Since an optimum input voltage is provided such as to make an input/output voltage difference to be a predetermined value in accordance with a voltage output from a regulator or voltages output from a regulator group. Therefore, an energy loss in the regulator can be significantly reduced.

Further, electric current amount flowing at the power terminal can be reduced, it is possible to minimize the power terminals and wiring lines.

As a result of the regulators being arranged into groups, the number of power terminals can be made smaller than the number of regulators, without involvement of deterioration of the voltage control properties of the respective regulators.

Further, resistance of the wiring on the semiconductor chip can be reduced by arranging the power terminals in the vicinity of the respective regulators, thereby the energy loss can be minimized, or improvement can be made in the input/output voltage differences.

When the semiconductor device of the present invention is implemented on a printed wiring board or the like, a power line can be separately routed on the printed wiring board. Therefore, the power line can be provided separately depending on an application.

Since the loss of the multiple-output power device has been reduced, the mobile device of the present invention can extend the operation time of the mobile device operated by the battery power.

DESCRIPTION OF THE PREFERRED EMBODIMENTS

Figure 1:
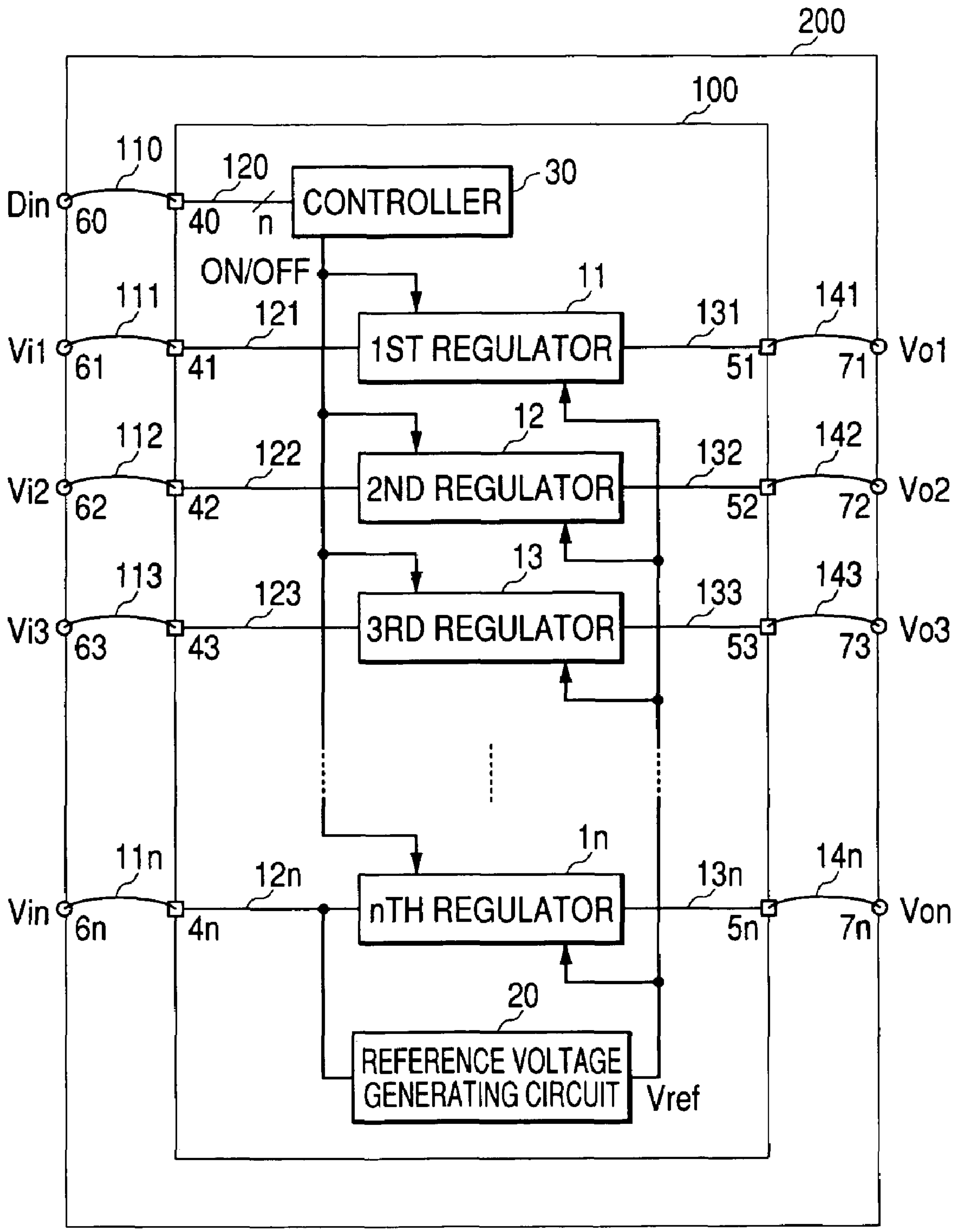
FIG. 1 is a view showing the configuration of a multiple-output power device according to a first embodiment of the present invention.

Embodiments of a multiple-output power device of the present invention will be described by reference to the drawings. FIG. 1 is a view showing the configuration of a multiple-output power device 200 according to a first embodiment of the present invention.

In FIG. 1, an IC chip body 100 is provided with a first regulator 11 for outputting a first output voltage Vo1; a second regulator 12 for outputting a second output voltage Vo2; a third regulator 13 for outputting a third output voltage Vo3; and an $n^{th}$ regulator in for outputting an $n^{th}$ output Von.

An input side of the first regulator 11 is connected to a first power pad 41 by way of an internal wire 121. Moreover, the power pad 41 is connected to a correspondingly-provided first power terminal (a power pin) 61 by means of, e.g., a bonding wire 111. Meanwhile, an output side of the first regulator 11 is connected to a first output pad 51 by way of an internal wire 131. Further, the output pad 51 is connected to a correspondingly-provided first output terminal (an output pin) 71 by means of, e.g., a bonding wire 141. The first power pin 61 and the first output pin 71 are provided in correspondence to the first regulator 11.

Input and output sides of the remaining second to $n^{th}$ regulators 12 to 1*n* are also configured with similar circuit wiring. The input sides of these regulators are connected to second to $n^{th}$ power pads 42 to 4*n* by way of internal wires 122 to 12*n* and further connected to second to $n^{th}$ power pins 62 to 6*n* by means of, e.g., bonding wires 112 to 11*n*. Output sides of the regulators are connected to second through $n^{th}$ output pads 52 to 5*n* by way of internal wires 132 to 13*n* and further connected to second to nth output pints 72 to 7*n* by means of, e.g., bonding wires 142 to 14*n*. Specifically, the second to $n^{th}$ power pins 62 to 6*n* and the second to $n^{th}$ output pins 72 to 7*n* are provided in correspondence to the second to $n^{th}$ regulators 12 to 1*n*.

Thus, in the first embodiment, the plurality of corresponding power pins 61 to 6*n* are independently provided on the input sides of the plurality of regulators 11 to 1*n*. Input voltages Vi1 to Vin to be supplied to the corresponding regulators 11 to 1*n* are applied to the respective power pins 61 to 6*n*.

Meanwhile, the voltages Vo1 to Von regulated by the regulators 11 to 1*n* are output from the plurality of output pins 71 to 7*n* and supplied to unillustrated load devices.

Figure 2:
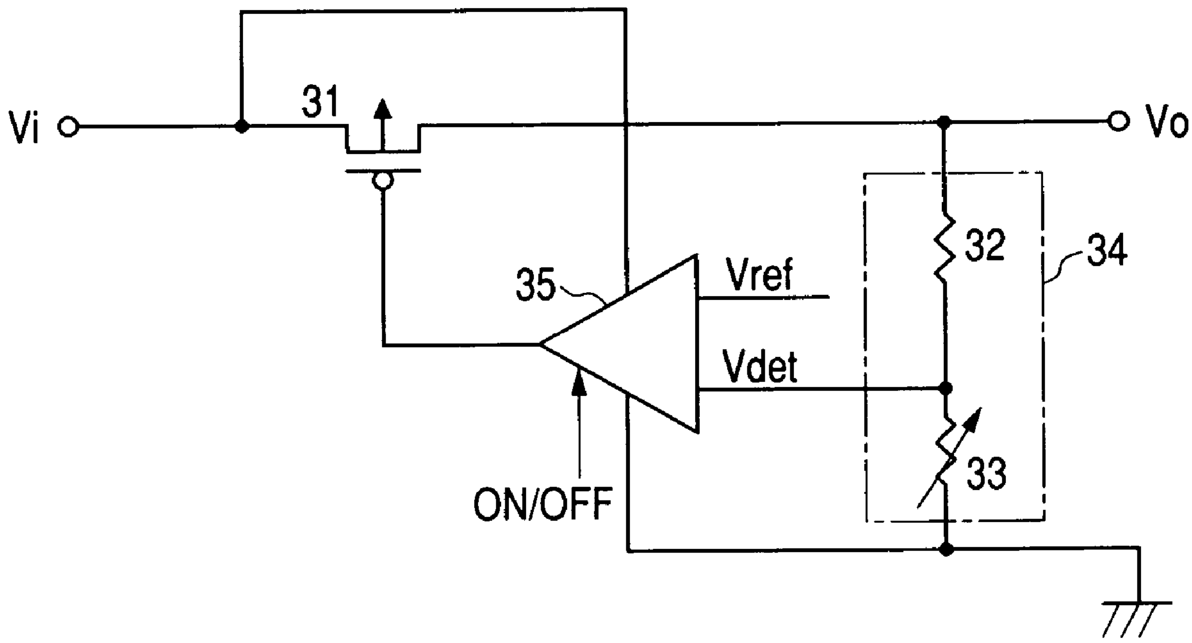
FIG. 2 is a view showing the configuration of a regulator used in the present invention.

Here, each of the regulators 11 to 1*n* is formed from a series regulator. As shown in , e.g., FIG. 2, the series regulator has a control transistor 31 connected between an input terminal and an output terminal; an output voltage detection circuit 34 which acquires a detection voltage Vdet by dividing the voltage Vo output from the output terminal with resistors 32 and 33; and a differential amplifying circuit 35 which receives, as inputs, the detection voltage Vdet and the reference voltage Vref, compares them with each other, and controls the control transistor 31 in accordance with a result of comparison. By means of this configuration, the input voltage Vi is regulated under control of the control transistor 31 such that the detection voltage Vdet becomes equal to the reference voltage Vref, thereby producing a predetermined output voltage Vo. A p-type or n-type MOS transistor or PNP-type or NPN-type bipolar transistor is preferably used as the control transistor. In FIG. 2, the p-type MOS transistor is used. The regulators are brought into an operating or suspended state by means of an ON/OFF state of an ON/OFF control signal output from the controller shown in FIG. 1. In the suspended state, the control transistor 31 is deactivated, and the operating power of the differential amplifying circuit 35 is also turned off. Accordingly, the power consumption achieved at this time becomes minimum. The respective regulators constituting the regulators 11 to 1*n* can also employ a switching regulator in lieu of the series regulator.

The voltages Vo1 to Von of the regulators 11 to 1*n* are regulated in accordance with voltages required by the respective load devices connected to the output pins 71 to 7*n*. The voltages input to the regulators 11 to 1*n* have hitherto been a single source voltage Vcc. However, the power pins 61 to 6*n* of the present invention are provided independently, and hence predetermined input voltages can be supplied. For instance, in a situation where the first through third output voltages Vo1, Vo2, and Vo3 are 2.5 volts, 2.0 volts, and 1.8 volts, respectively, input/output voltage differences in the respective first through third regulators 11, 12, and 13 are 0.5 volts, 1.0 volts, and 1.2 volts, respectively, on condition that the source voltage Vcc is a common voltage of 3 volts, whereby loss energies corresponding to respective load currents develop. However, according to the present invention, the voltages are set to optimum voltages obtained by increasing the output voltages corresponding to the input voltages Vi1, Vi2, and Vi3 by a voltage required for control operation; e.g., 0.3 volts; that is, 2.8 volts, 2.3 volts, and 2.1 volts. Thus, the input voltages required by respective control operations are set to optimum values beforehand in accordance with the voltages output from the corresponding regulators, thereby decreasing the energy losses developing in the regulators.

Figure 3:
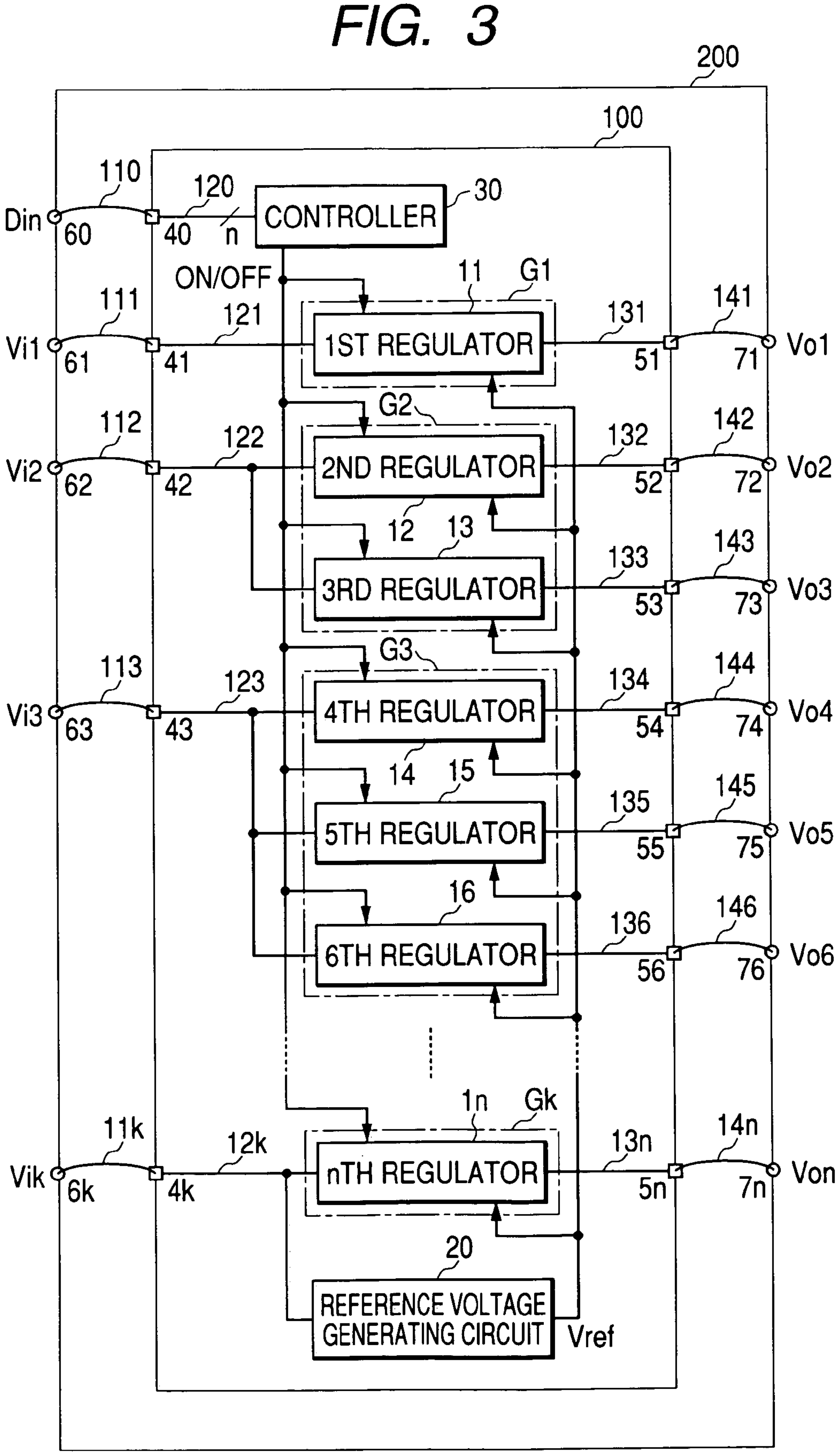
FIG. 3 is a view showing the configuration of a multiple-output power device according to a second embodiment of the present invention.
Figure 4:
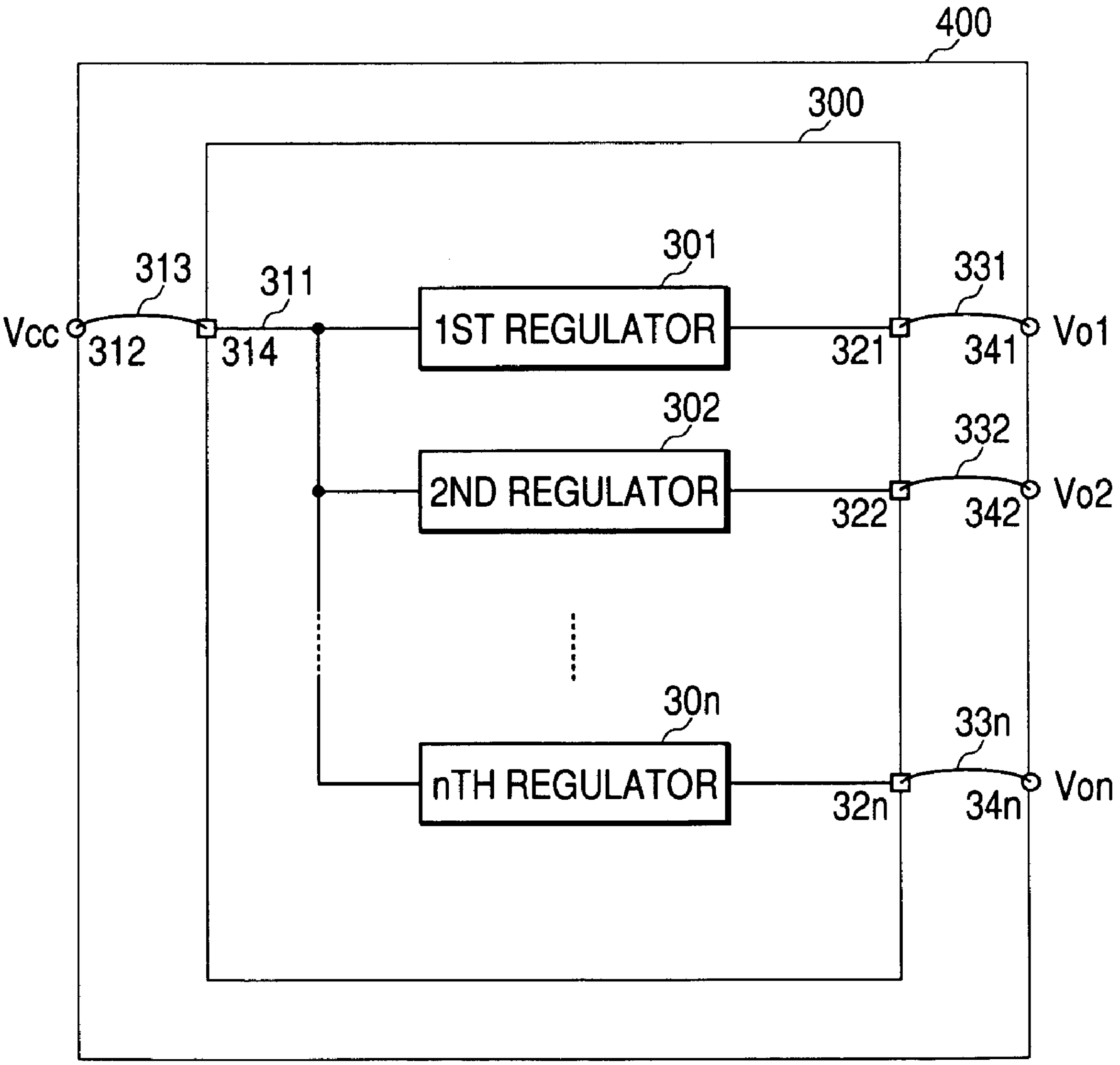
FIG. 4 is a view showing the configuration of a conventional multiple-output power device.

A reference voltage generation circuit 20 shown in FIG. 3 generates the reference voltage Vref and supplies the thus-generated reference voltage Vref to the respective regulators 11 to 1*n*. The reference voltage generation circuit 20 preferably adopts a band gap constant voltage circuit, thereby generating a stable, constant voltage having small temperature dependency. One or a plurality of reference voltages is generated in accordance with the constant voltage. Consequently, one constant voltage can be shared as a reference voltage among the plurality of regulators. The reference voltage may be generated within each of the regulators without provision of the reference voltage generation circuit 20. Alternatively, the reference voltage may be taken from the outside.

The controller 30 individually controls the respective regulators 11 to 1*n* into an operating state or a suspended state in accordance with an ON/OFF state of the ON/OFF control signal. This control operation is performed in response to a command Din, such as serial data, input from the outside of the multiple-output power device 200. For instance, when the multiple-output power device is used in a mobile cellular phone, the required regulators 11 to 1*n* are set to an operating or suspended state in accordance with a request, such as call origination, communication, call arrival, or photographing with a camera. Here, the command Din may be n-bits data (one bit or more) and supplied to the controller 30 by way of the data pin 60, the bonding wire 110, the data pad 40, and the internal wire 120.

As mentioned previously, according to the first embodiment, the power pins 61 to 6*n* are provided in correspondence with the regulators 11 to 1*n*. The power pins 61 to 6*n* are supplied with the input voltages Vi1 to Vin from the outside. In the case of the mobile device which operates on battery power, the regulators 11 to 1*n* are very frequently switched between the operating state and the suspended state in accordance with the necessity for power supply, in order to make the operable time of the battery as long as possible. Even in this case, according to the present invention, the regulators are less influenced by the operating and suspended states of other regulators or the states of the load devices connected to the regulators. Therefore, the voltage control properties of the respective regulators 11 to 1*n* become less deteriorated.

The input voltages Vi1 to Vin supplied to the power pins 61 to 6*n* from the outside are supplied as optimum input voltages such that input/output voltage differences become predetermined values in correspondence with the output voltages Vo1 to Von. The energy loss developing in the regulator is determined by an input/output voltage difference and an output current. Hence, the losses in the regulators are decreased.

The power pins 61 to 6*n* are provided for the regulators 11 to 1*n*, respectively. As a result, since the amount of electric current flowing at each of the pins can be reduced which means that the unit area required for the power pin is reduced, a wire to be connected to the power pin can be thus made smaller. On the contrary, the power pins 61 to 6*n* are provided for the respective regulators 11 to 1*n*, which reduces the electric current flowing at each of the pins, thereby the current capacity of each regulator can be set to a large value instead of reducing the size of the wire to be connected to the power pin. Consequently, a large output current can be realized as whole.

In view of circuit wiring, the power pins 61 to 6*n* are provided in the vicinity of the respective regulators 11 to 1*n*. As a result, the wiring resistance of the semiconductor chip can be decreased, and the output pins Vo1 to Von can also be disposed in the vicinity of the respective regulators 11 to 1*n*. In this case, in contrast with the case of the embodiment shown in FIG. 1, the power pins 61 to 6*n* and the output pins Vo1 to Von are provided on the same side where the semiconductor device 200 is placed. Therefore, a reduction in energy losses and an improvement in the input/output voltage difference can be effectively achieved.

When the semiconductor device 200 of the present invention is mounted on a printed wiring board (PCB), the power lines can be separately routed on the PCB. Consequently, the power lines can be separated from each other on the PCB in accordance with the application.

Since the losses in the multiple-output power device are decreased as a result of the multiple-output power device 200 being used in the mobile device such as a mobile cellular phone, the time during which the mobile device can operate on battery power can be extended.

FIG. 3 is a view showing the configuration of a multiple-output power device 200 according to a second embodiment of the present invention. In the second embodiment, the plurality of regulators 11 to 1*n* are arranged solely or into several groups. Regulator groups are configured such that a plurality of output voltages are output in response to a common input voltage. A common power pin is provided on a per-regulator-group basis, and an input voltage is supplied to the respective regulator group. Even in this case, the output voltages regulated by the respective regulators are individually supplied to respective loads by way of the output pins.

In connection with FIG. 3, explanations are given chiefly on features which differ from those shown in FIG. 1. Those elements which are the same as those shown in FIG. 1 are assigned the same reference numerals, and repeated explanations thereof are omitted.

In FIG. 3, a regulator 11 solely constitutes a group G1; regulators 12, 13 constitute a group G2; regulators 14 to 16 constitute a group G3; . . . a regulator in solely constitutes a group Gk.

Thus, even when the regulators 11 to 1*n* have been arranged into groups, the regulated voltages output from the respective regulators 11 to 1*n* are supplied as output voltages Vo1 to Von from the individually-corresponding output pins 71 to 7*n* to respective loads, by way of corresponding internal wires 131 to 13*n*, output pads 51 to 5*n*, and bonding wires 141 to 14*n*.

Meanwhile, input voltages are supplied to the respective regulators 11 to 1*n* for the respective groups G1 to Gk.

For instance, in FIG. 3 the group G1 includes one regulator 11, and the group Gk includes one regulator in. Hence, the groups G1, Gk assume the same configuration as that shown in FIG. 1.

As to the group G2, the input sides of the regulators 12, 13 belonging to the group G2 are connected commonly to the power pad 42 by means of the internal wire 122 and further to the power pin 62 byway of the bonding wire 112. Consequently, the power pin 62 is supplied with the power to be supplied to the regulators 12, 13.

As to the group G3, the input sides of the regulators 14, 15, and 16 belonging to the group G3 are connected commonly to the power pad 43 by way of the internal wire 123 and further to the power pin 63 by way of the bonding wire 113. Consequently, the power pin 63 is supplied with the power to be supplied to the regulators 14, 15, and 16.

Arrangement of the regulators into groups mentioned above is implemented by combining the regulators such that a problem, which has hitherto arisen, does not arise even when the power pin is made common.

In relation to the operations of the regulators 12, 13 belonging to the group G2, the regulators are not controlled into an operating state simultaneously. In the embodiment shown in FIG. 3, two regulators are provided. However, if requirements are fulfilled, three or more regulators may be employed. Specific examples include a regulator for use with a headphone amplifier and a regulator for use with a speaker amplifier, both being used in a mobile device. Further, the examples include a regulator for use with a spindle motor in a CD, or the like, and a regulator for use with a loading motor to be used for inserting and drawing a tray. In the case of these examples, only one of the regulators is brought into an operating state. Specifically, the regulators are used exclusively or selectively.

As to the illustrated regulators 14, 15, and 16 belonging to the group G3, this configuration is applied to a case where a small electric current flows into the respective regulators. Specifically, in a situation where the electric current flowing through the regulators 14, 15, and 16 is small, even when any one of the regulators is brought into an operating or restored state, this regulator does not exert any adverse effects on the remaining regulators of that group. Therefore, even when the regulators 14, 15, and 16 through which a small electric current flows are arranged into a group, the voltage control properties of the respective regulators 14, 15, and 16 are not deteriorated to such an extent that a problem arises.

As has been described above, the second embodiment achieves the same advantage as that of being achieved in the first embodiment. Further, since the regulators have been arranged into the groups, the power pins can be made smaller in number than those required for the regulators. Consequently, the overall number of pins can be reduced, thereby contributing to downsizing of the semiconductor device 200.

What is claimed is:

1. A multiple-output power device with a plurality of regulators integrated into a single semiconductor integrated circuit from which a plurality of controlled voltages are output, said multiple-output power device comprising:

a plurality of power terminals, being provided for regulator groups, where each of a plurality of power terminals supplies a common input voltage to respective one of said regulator groups, each group of said regulator groups including one or more regulators; and a plurality of output terminals for outputting regulated output voltages from said plurality of regulators to the outside, wherein each of said plurality of regulators regulates a voltage input from respective one of said plurality of power terminals by comparing a detection voltage corresponding to an output voltage thereof with a reference voltage so as to output an output voltage, wherein at least one of said regulator groups includes two or more regulators which are not simultaneously controlled as an operating state.

2. The multiple-output power device according to claim 1, wherein at least one of said regulator groups includes only one regulator, and at least one of the remaining regulator groups includes two or more regulators.

3. The multiple-output power device according to claim 1, said multiple-output power device includes a controller for individually controlling said plurality of regulators into an operating or suspended state.

4. The multiple-output power device according to claim 1, said multiple-output power device includes a reference voltage generation circuit for supplying said reference voltage to said plurality of regulators.

5. The multiple-output power device according to claim 1, wherein input voltages having different voltages are supplied to said plurality of regulators according to the predetermined values of said regulators.

* * * * *